June 14, 1949.  A. P. FALL  2,473,470
ALIGHTING GEAR
Filed June 12, 1944
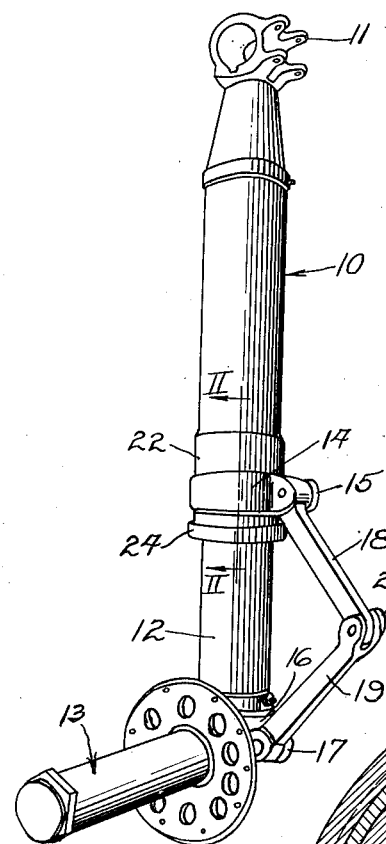
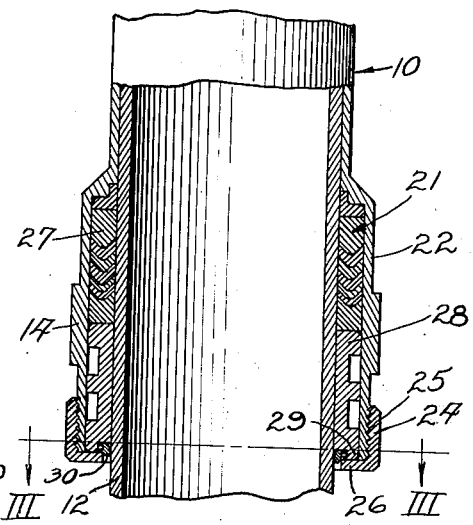
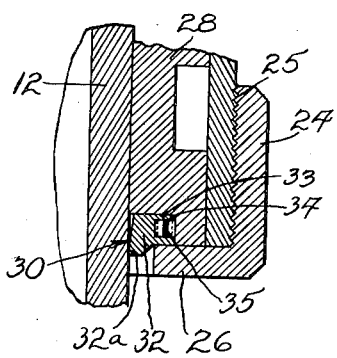
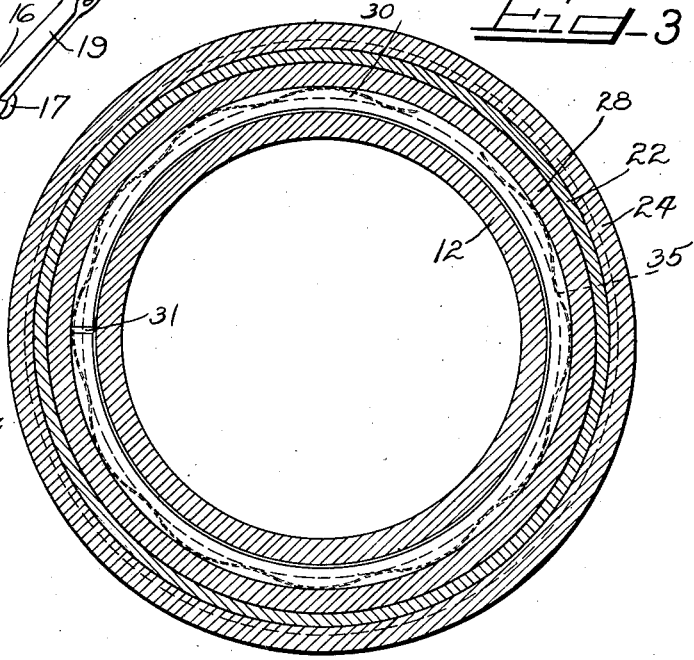
INVENTOR
Albert P. Fall
by Charles H. Wills
Attys Patented June 14, 1949

2,473,470

UNITED STATES PATENT OFFICE 2,473,470

ALIGHTING GEAR

Albert P. Fall, Toledo, Ohio

Application June 12, 1944, Serial No. 539,970

2 Claims. (Cl. 308—4)

This invention is directed to an improved alighting gear for aircraft or the like and relates more particularly to an improved packing gland assembly for such a structure.

My invention has for its principal object the improvements of a retractable alighting gear whereby such a gear is enabled to withstand extreme conditions for a greater number of flying hours than is the case with present structures.

An alighting gear of the type shown herein by way of example, includes an upper sleeve, the upper end of which may be pivotally attached to the aircraft and a lower rod, to the bottom of which the axle of the wheel is attached. This lower rod telescopes slidingly within the upper sleeve with shock absorbing action. The shock absorbing medium within the sleeve of the strut structure is usually oil or some other satisfactory solution and thus it is necessary that an efficient seal be established between the lower, inside surface of the sleeve and the outside surface of the rod.

With the packing gland structures utilized in the past, it has been found that considerable difficulty has been experienced when the alighting gear is subjected to extreme conditions brought about by the great distances that present day aircraft travel. The ultimate in a packing gland structure is an assembly which is capable of wiping the rod perfectly clean as it slides within the sleeve to prevent dirt, grit, frost, ice or moisture from serrating or otherwise destroying the gland and also from passing through the gland upwardly into the sleeve.

It is an important object of the present invention to provide an improved packing gland assembly which not only affords an efficient seal for the operating liquid but also efficiently removes contaminating moisture, dirt or ice from the rod after it is accumulated thereon, this cleaning operation taking place during the reciprocation of the rod into the sleeve and being effective upon very thin layers of extraneous, contaminating matter.

One of the contributing factors to the difficulties which are encountered in present packing glands, is the fact that under present conditions a plane may, in a single flight, traverse areas having extreme weather conditions. For instance, a single flight may encounter extremely low temperatures whereupon frost and ice accumulate on the rod and also may traverse desert areas over which the air carries a considerable percentage of sand and grit. Previous efforts have been made to remove ice, frost and grit from the rod but it has been found that these structures ride over this extraneous material whereby it engages the sealing gland to serrate the same to initiate oil leakage.

It is another object of the present invention to provide an improved packing gland assembly in which the accumulated ice is efficiently removed from the rod so that it will not be forced past the gland to serrate the same and initiate oil leakage.

It is still another object of the present invention to provide an improved packing gland assembly having a sealing gland portion and also having a wiping or scraping portion so constructed as to efficiently cut away ice and frost from the surface of the rod as it reciprocates into the sleeve and to remove grit, moisture and oil from the surface of the rod before the wiped or scraped surface reciprocates through the sealing gland portion.

It is another object of the present invention to provide a wiper-scraper arrangement wherein a wiper annulus is positively pressed against the telescoping rod so that it will not ride over frost, ice or grit particles but will remove the same before the rod surface slides past a companion sealing gland.

More specifically, it is an object of the invention to provide, in a packing gland assembly of the above character, a split wiper annulus having an inner cutting edge and an outer compressor carrier groove housing a resilient compressor for urging the cutting edge inwardly against the surface of a telescoping rod to be wiped, the cutting edge thus being positively urged into cutting engagement with extraneous matter on the rod so that it will not ride over the same when the rod slides thereby.

Many other objects and advantages of the invention will become apparent from the following description and accompanying drawings in which:

Figure 1 is a perspective view of a landing strut assembly embodying the features of my invention;

Figure 2 is a cross-sectional view taken on the line II—II of Figure 1;

Figure 3 is an enlarged cross-sectional view taken on the line III—III of Figure 2; and Figure 4 is a fragmentary enlarged cross-sectional view of the wiper or scraper ring construction showing the manner of its attachment in the assembly.

It is to be understood that the embodiment shown herein is for illustrative purposes only and may be changed or modified without departing from the spirit and scope of the invention as set forth in the appended claims.

As best shown in Figure 1 the alighting gear shown herein by way of example includes an upper sleeve 10 which serves as a compression cylinder. The upper end of the sleeve or cylinder 10 is provided with a head 11 by means of which the entire alighting assembly may be pivotally secured to the associated aircraft for retraction. As will be seen from Figure 2, the lower end of the sleeve 10 is open to slidingly receive a rod 12 upon the lower end of which is mounted any suitable axle assembly 13 for receiving the aircraft wheel.

To the end that the rod 12 may slidingly reciprocate through the opened lower end of the sleeve 10 and yet will not rotate therein, a collar 14 having lugs 15 is provided in non-rotatable relationship around the lower end of the sleeve 10. Another similar collar 16 having lugs 17 is provided at the lower end of the rod 12, these collars being connected by a torque link assembly including links 18 and 19 which are pivoted together as at 20 and are pivoted at their remote ends respectively to the lugs 15 and 17. Thus it will be seen that upon application of pressure to the alighting assembly, the rod 12 will be enabled to reciprocate through the lower end of the sleeve 10, the torque linkage moving to accommodate this reciprocation and at the same time positively preventing rotation of the rod within the sleeve 10.

From the foregoing it will be seen that some means must be provided in the mechanism to prevent leakage of oil and thus loss of operating pressure through the sliding junction of the lower end of the sleeve or cylinder 10 and the adjacent portion of the outside surface of the rod 12. This is accomplished herein by means of a packing gland assembly 21 which is cylindrical in configuration and is housed within an enlarged portion 22 at the lower end of the sleeve 10.

The packing assembly is disposed within the enlarged portion 22 of the sleeve and is compressed therein by a nut 24 having an upwardly extending flange that is internally threaded to engage with external threads at the lower end of the portion 22 of the sleeve as shown at 25. The nut 24 is provided at the lower part thereof with a radially inwardly extending flange 26, the inner edge of which prescribes a circle having a diameter somewhat larger than the outside diameter of the rod 12 which passes therethrough. Thus there is provided between the edge of the flange 26 and the rod 12 an annular space available for purposes to be described presently.

In order that the packing gland assembly 21 may carry out its principal purpose, that is the provision of a tight, sliding seal between the sleeve 10 and the rod 12, a compressible sealing portion 27 made up of a plurality of segments in the usual manner is provided in the upper part of the enlarged housing portion 22. The packing gland assembly is completed by the provision of an annular bearing member 28 which fits within the lower part of the enlarged housing 22 of the sleeve 10 and has an inside diameter of such a size that it slidingly receives the rod 12. This packing assembly is maintained in the sleeve as shown in Figure 2 by the attachment of the nut 24 upon the lower end of the sleeve, whereupon the flange 26 thereof is drawn upwardly against the bearing member 28 to compress the yieldable gland portion 27 into the position shown.

As indicated previously, one of the major difficulties encountered in the construction and use of telescoping alighting gears, is the entrance of sharp particles such as ice, grit and dirt into the sliding junction between the telescoping parts, whereby the sealing gland is cut and serrated and the outer surface of the rod is worn or grooved so that oil leakage is initiated. This condition then progresses more rapidly since the leaking oil picks up particles of grit whereby, during further reciprocation of the rod, destruction of the seal develops at an increasingly rapid rate. It has also been found that even a slight coating of frost upon the outer surface of the rod 12 serves to produce this undesirable condition and accordingly it is necessary to provide some means which will efficiently remove any contaminating matter whatsoever from the outer surface of the rod and leave said surface perfectly clean as it passes through the sealing gland.

To this end there is provided at the lower inside edge of the bearing member 28 a milled annular groove 29, which is arranged to receive a wiper or scraper assembly. It will be noted that since the groove 29 is positioned at the extreme lower part of the sleeve 10, the wiper assembly therein, to be described presently, will engage the surface of the wheel rod 12, during retraction thereof, before that portion of the surface so engaged passes along the compressible, destructible sealing gland portion 27. Thus the rod surface is cleaned before it passes the gland and in this manner the introduction of cutting particles or moisture into the glanded junction by retraction of the rod is eliminated.

The wiper assembly shown herein includes a wiper-scraper annulus 30 which is split as shown at 31 in Figure 3. The wiper annulus 30 includes a radially inner portion 32 which is provided with a downwardly projecting rod engaging, cutting edge 32a and a radially outer portion 33 which seats within the bearing groove 29 and is provided with a compressor groove 34 adapted to receive compression means by virtue of which the annulus 30 and particularly an edge 32a thereof is compressed resiliently against the outer surface of the rod 12. Any suitable compressor means may be utilized, however, there is shown herein an undulated spring steel annulus 35 having a depth substantially equal to the compressor groove 34 in the wiper annulus 30, the radially inwardly extending peaks of which press against the inner wall of the groove 34 while the radially outer peaks thereof press against the radially outer wall of the bearing groove 29. Thus it will be seen that the compressor annulus 35 urges the entire wiper annulus radially inwardly so that the edge 32a thereof bears inwardly against the outer surface of the rod 12 as the latter is retracted into the sleeve 10. This direction of the edge 32a of the wiper annulus is produced by a radial outward and upward inclination of the radially inner surface of the annulus 30 as shown clearly in Figure 4.

The annulus 30 is maintained in the bearing groove 29 by engagement of the radially outer portion of part 33 thereof with the radially inner portion of the upper surface of the flange 26 on the nut 24. From Figure 4 it will be seen that as the nut 24 is screwed onto the lower end of the sleeve 10, the flange 26 is drawn upwardly until it complements the groove 29 in the bearing to engage against the radially outer part 33 of the annulus 30. As indicated previously, the radially inner edge of the flange 26 on the nut 24 is spaced from the outer wall of rod 12 to provide an annular opening. This opening, as will be seen from Figure 4 will be adapted to receive the radially inner, lower cutting edge portion of the annulus 30. With this construction it will be seen that the flange 26 of the nut 24 serves to protect the cutting edge 32a of the annulus 30 by virtue of its extension downwardly beyond that edge. In this manner it will be seen that no part of the packing gland assembly and particularly the wiping or scraping annulus thereof extends outwardly of the assembly where it might be subjected to damage.

It will be understood of course that while the compressor groove 34 shown herein is positioned substantially, vertically centrally of the radially outer portion 33 of the annulus 30, this groove may be disposed in a position vertically upwardly or downwardly of that shown to give different compression characteristics, as desired, dependent upon circumstances encountered in the use of the alighting gear.

From the foregoing it will be seen that there is provided herein a packing gland assembly which includes a resilient sealing portion and a rod cleaning portion, whereby extraneous matter, accumulated on the surface of the rod will first be removed therefrom by the annulus before the surface of the rod is drawn into contact with the resilient sealing portion of the gland.

Also it will be seen that the wiping annulus 30 and particularly the downwardly and inwardly directed cutting edge 32a thereof will be compressed inwardly by the compressor 35 housed in the groove 34 so that the cutting edge will not ride over extraneous matter on the surface of the rod 12. Instead, the edge 32a will be urged inwardly in a cutting direction.

Preferably the annulus 30, when associated with the rod 12, is slightly spread to permit inward compression thereof against the rod by compressor 35. This insures the proper amount of pressure of the cutting edge 32a against the rod and also affords a tight fit of the annulus to the rod if the latter is slightly out of round or slightly off size.

I claim as my invention:

1. In a packing gland for disposition at the junction between the telescoping members of an alighting gear or the like in which a piston rod reciprocates with respect to a cylinder and in which a bearing member is disposed in the cylinder about the piston adjacent said junction with the bearing formed with an annular groove, that improvement which comprises a one-piece split metal wiping or scraping ring disposed in said bearing groove, said ring having at the radially inner part thereof a cutting edge against the piston surface and having in its convex peripheral portion a compressor groove, and a compressor in said compressor groove between it and the said bearing groove acting with squeeze grip action about the ring tending to compress the ring and reduce the diameter of its cutting edge and thus increase the contact of the cutting edge against the piston.

2. In a packing gland for disposition at the junction between the telescoping members of an alighting gear or the like in which a piston rod reciprocates with respect to a cylinder and in which a bearing member is disposed in the cylinder about the piston adjacent said junction with the bearing formed with an annular groove, that improvement which comprises a one-piece split metal wiping and scraping ring disposed in said bearing groove, said ring having at the radially inner part thereof a cutting edge against the piston surface and having in its convex peripheral portion a compression groove coextensive with the circumferential extent of the ring, and a one-piece split sinusoidal spring in said groove having the apices of one side surface in bearing engagement with the concentric surface of the bearing groove and the apices of the other side surface of the spring against the bottom of the ring groove to thereby exert wedging action about the ring to squeeze press the cutting edge thereof into tight engagement with the piston surface.

ALBERT P. FALL.

REFERENCES CITED

The following references are of record in the file of this patent:

UNITED STATES PATENTS

| Number | Name | Date |
| --- | --- | --- |
| 1,497,125 | Sorrells | June 10, 1924 |
| 1,594,935 | Force | Aug. 3, 1926 |
| 1,822,521 | Fox et al. | Sept. 8, 1931 |
| 1,837,115 | Cook | Dec. 15, 1931 |
| 1,900,437 | Durham | Mar. 7, 1933 |
| 1,992,746 | Fortune | Feb. 26, 1935 |
| 2,197,474 | Johnson | Apr. 16, 1940 |
| 2,290,507 | Thompson | July 21, 1942 |